E. N. MAULL.
STRIPPER AND HULLER.
APPLICATION FILED APR. 25, 1919.

1,405,610.

Patented Feb. 7, 1922.
2 SHEETS—SHEET 1.

E. N. MAULL.
STRIPPER AND HULLER.
APPLICATION FILED APR. 25, 1919.

1,405,610.

Patented Feb. 7, 1922.
2 SHEETS—SHEET 2.

Inventor
E. N. Maull
By C. A. Snow & Co.
Attorneys.

UNITED STATES PATENT OFFICE.

EDWARD N. MAULL, OF JACKSONVILLE, FLORIDA, ASSIGNOR OF ONE-HALF TO HENRY C. PLOOF, OF JACKSONVILLE, FLORIDA.

STRIPPER AND HULLER.

1,405,610.   Specification of Letters Patent.   Patented Feb. 7, 1922.

Carved out of application on which Patent No. 1,232,064 was granted July 3, 1917, and filed after grant of that patent. This application filed April 25, 1919. Serial No. 292,533.

*To all whom it may concern:*

Be it known that I, EDWARD N. MAULL, a citizen of the United States, residing at Jacksonville, in the county of Duval and State of Florida, have invented a new and useful Stripper and Huller, of which the following is a specification.

On June 9, 1916, I filed an application for Letters Patent on a bean and pea hulling machine, Serial No. 102,707, which matured into Patent Number 1,232,064 granted on July 3, 1917. In the application above mentioned, division was called for between a screening mechanism upon the one hand, and a pea huller or vine and seed stripper upon the other hand. Having elected, in case Number 102,707, to prosecute claims to the screening mechanism, I now propose, proceeding within the period allowed by law, to seek protection on the invention described broadly as a pea huller or vine and seed stripper.

In view of the foregoing, it is the object of the present application to improve the hulling and stripping mechanism, novel means being provided for stripping the pods from the vines, for breaking open the pods and for caring both for the trash and for the beans, peas or the like after the same have been separated from the pods.

It is within the province of the disclosure to improve generally and to enhance the utility of devices of that type to which the present invention appertains.

With the above and other objects in view which will appear as the description proceeds, the invention resides in the arrangement and combination of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
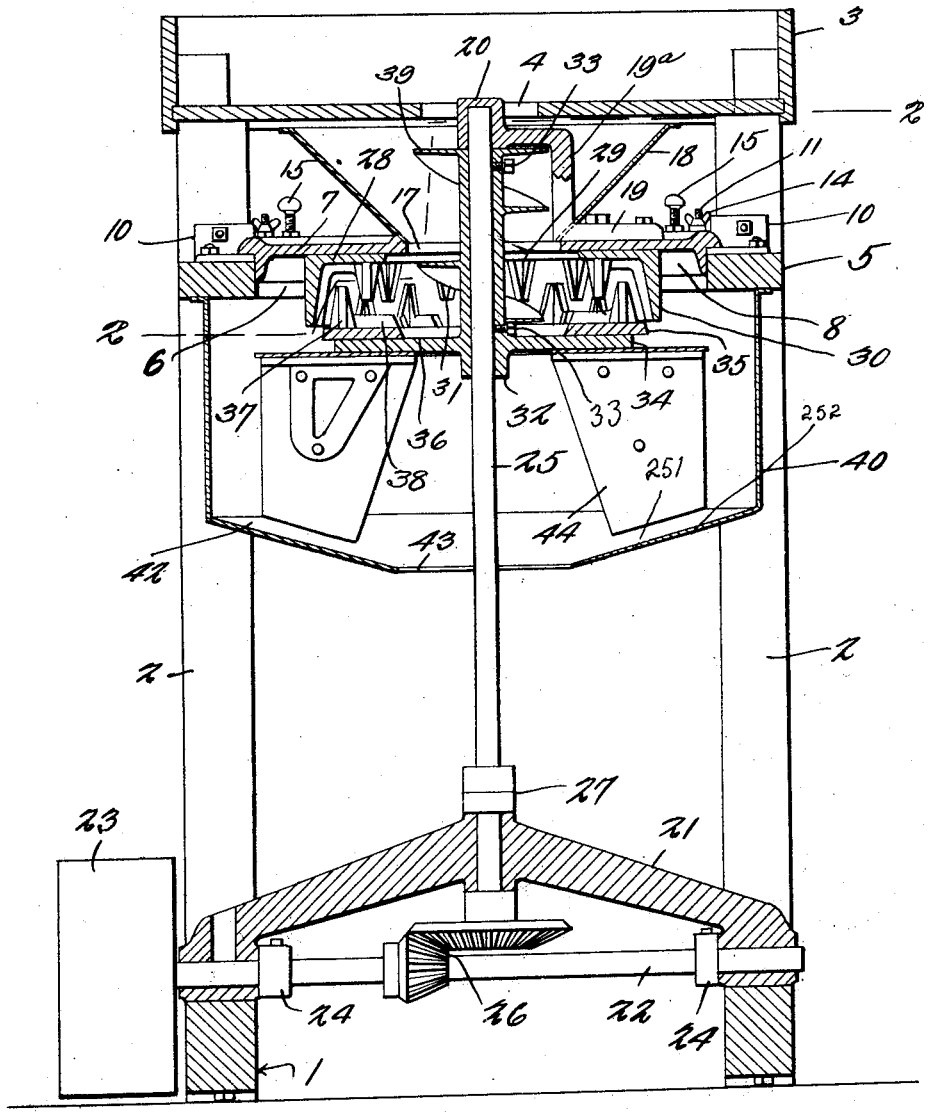
Figure 2:
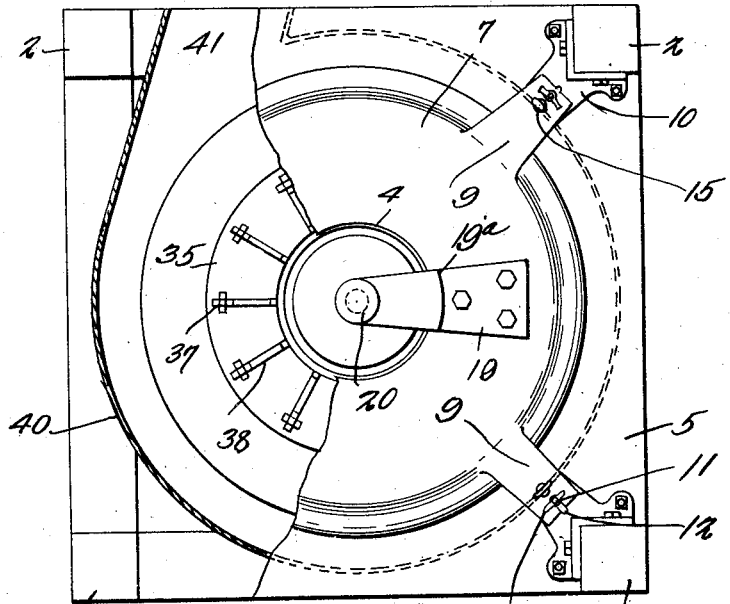
Figure 3:
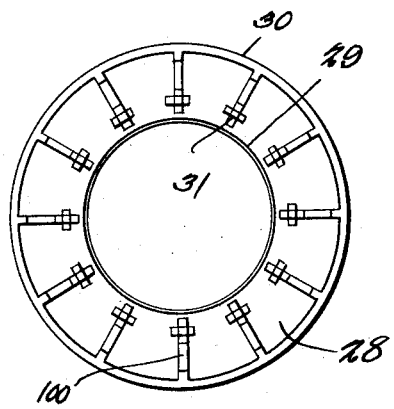
Figure 4:
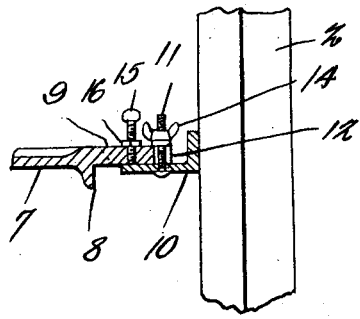

Figure 1 shows in vertical longitudinal section, a machine constructed in accordance with the invention, parts appearing in elevation; Figure 2 is a transverse section taken approximately on the line 2—2 of Figure 1, parts being left in elevation; Figure 3 is a bottom plan showing the upper stripping ring; and Figure 4 is a fragmental section showing the means for supporting the cap which carries one of the stripping members.

In carrying out the invention, there is provided a frame 1 which may be variously constructed without jeopardizing the utility of the invention. The frame 1 may include corner posts 2 supporting a receiver 3 having a bottom opening 4. The frame 1 includes a platform 5, which may be constructed as desired, the platform being located below the receiver 3 and being supplied with an opening 6. Located above the platform 5 is a cap 7 having a flange 8 which projects into the opening 6, the cap carrying radial arms 9 overlapped on brackets 10 mounted on the posts 2 of the frame 1. The brackets 10 carry upstanding screws 11 received in slots 12 formed in the ends of the arms. Wing nuts 14 are threaded upon the screws 11 and coact with the arms 9. Thrust screws 15 are threaded into the arms 9 and bear on the brackets 10, the thrust screws being held in adjusted positions by lock nuts 16. The cap 7 has a central opening 17, a hopper 18 being attached to the cap, about the opening. A bracket 19 is mounted on the cap 7 and includes an upright portion 19$^a$ on the upper end of which a bearing 20 is formed. The lower portion of the frame 1 carries a cross member 21 wherein a drive shaft 22 is journaled, the drive shaft being actuated by a pulley 23 or in any suitable manner, there being collars 24 on the drive shaft, which, coacting with the end portions of the cross member 21, prevent the shaft from moving endwise. A driven shaft 25 is journaled in the cross member 21 and in the bearing 20 of the bracket 19. The shaft 25 is operatively connected with the shaft 22 by means of intermeshing beveled gears 26 or otherwise. There are collars 27 on the shaft 25, and these collars, cooperating with the cross member 21, prevent the shaft 25 from moving downwardly to such an extent as to produce unnecessary friction between the cooperating beveled gears 26.

A stripping ring 28 is secured to the under surface of the cap 7 and has an opening 29. The ring 28 is supplied with a depending rim 30, and teeth 31 project downwardly from the ring. The teeth 31 preferably are of cruciform cross section, in order to enhance the efficiency of the teeth, although the construction above alluded to is not insisted upon. The rim 30 and the body portion of the ring 28 are supplied with ribs 100 which extend inwardly to the teeth 31.

A tubular member 32 is attached by set screws 33 or otherwise to the shaft 25 and includes a foot 34. An annular stripping member 35, substantially like the ring 28, is attached to the upper surface of the foot 34 and has an opening 36 through which the tubular member 32 passes. The annular member or ring 35 is supplied with upstanding teeth 37 and with ribs 38, of the sort hereinbefore described in connection with the ring 28, the construction being such that when the ring 35 is rotated with the shaft 25, the teeth 37 will clear the teeth 31 which project downwardly from the member 28. The tubular member 32 carries a feed screw 39 operating in the opening 17 of the cap 7.

A drum 40 is secured to the part 5 and has a tangential outlet 41, the drum including a funnel-shaped bottom 42 having an opening 43. Fan blades 44 are secured to the foot 34 and cooperate with the bottom 42 of the drum and with the side portion thereof.

In practical operation, the shaft 25 is driven from the shaft 22 by means of the intermeshing gears 26, and when the shaft 25 is rotated, the fan blades 44 will move in an orbit, the stripping ring 35 being rotated with respect to the fixed stripping ring 28, and the feed screw 39 being rotated likewise.

The vines are placed in the receiver 3 and are pressed downwardly through the opening 4 into the hopper 18, the vines being fed downwardly by the screw 39. In this connection, it is to be observed that, since a portion 19ª of the bracket 19 is disposed approximately parallel to the axis of rotation of the feed screw 39, the vines will be prevented from winding or twisting around the tubular member 32 which carries the feed screw. The feed screw 39 carries the vines from the hopper 18 downwardly through the opening 17 into the space between the stripping rings 28 and 35, and when the stripping ring 35 is operated, as aforesaid, the teeth 37 and 31 on the respective stripping rings break up the vines and open the pods. The trash passes downwardly into the drum 40 and leaves by way of the tangential outlet 41, under the action of the fan blades 44. The peas, beans or the like pass between the edge of the ring 35 and the rim 30 of the ring 28, the peas or beans being received on the sloping bottom 42 of the drum 40, from whence the peas or beans will pass through the opening 43. When the fan blades 44 are in operation, air is drawn upwardly through the opening 43, the air being ejected through the tangential outlet 41, by the action of the fan blades 44.

It may be desirable to adjust the vertical space existing between the stripping rings 28 and 35, so that the teeth 31 and 37 may cooperate properly, depending upon the size and nature of the product to be handled. This adjustment is effected by means of the thrust screws 15 and the wing nuts 14, in a manner which will be obvious when Figure 4 of the drawings is noted.

Having thus described the invention, what is claimed is:

1. In a machine of the class described, a fixed upper stripping member having a receiving opening; a feed screw rotatable in the opening; and a rotatable lower stripping member cooperating with the upper stripping member and carried by the feed screw, the feed screw extending into the space between the stripping members.

2. A machine of the class described, a fixed upper stripping member having a receiving opening; a feed screw rotatable in the opening; and a rotatable lower stripping member cooperating with the upper stripping member and carried by the feed screw; and a bearing for the feed screw, the bearing including a part disposed approximately parallel to the feed screw and close thereto, to prevent the winding of vines about the feed screw.

In testimony that I claim the foregoing as my own, I have hereto affixed my signature in the presence of two witnesses.

EDWARD N. MAULL.

Witnesses:
F. M. DURRANCE,
M. M. FAUD.